United States Patent
Li et al.

(10) Patent No.: US 10,290,865 B2
(45) Date of Patent: May 14, 2019

(54) POSITIVE ELECTRODE MATERIAL FOR LI-ION BATTERY, METHOD FOR PREPARING THE SAME, AND LI-ION POWER BATTERY CONTAINING THE SAME

(71) Applicant: CONTEMPORARY AMPEREX TECHNOLOGY CO., LIMITED, Ningde (CN)

(72) Inventors: Qifeng Li, Ningde (CN); Dingshan Ruan, Ningde (CN); Wei Liang, Ningde (CN); Na Liu, Ningde (CN); Long Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 131 days.

(21) Appl. No.: 15/704,687

(22) Filed: Sep. 14, 2017

(65) Prior Publication Data
US 2018/0090753 A1  Mar. 29, 2018

(30) Foreign Application Priority Data
Sep. 27, 2016  (CN) .......................... 2016 1 0852821

(51) Int. Cl.
*H01M 4/02* (2006.01)
*H01M 4/36* (2006.01)
(Continued)

(52) U.S. Cl.
CPC ............ *H01M 4/366* (2013.01); *C01G 53/50* (2013.01); *H01M 4/0416* (2013.01);
(Continued)

(58) Field of Classification Search
CPC ..................................................... H01M 4/02
See application file for complete search history.

(56) References Cited

U.S. PATENT DOCUMENTS

2005/0158546 A1* 7/2005 Shizuka ............. H01M 4/0404
428/402
2009/0230349 A1* 9/2009 Dahn ................... C01G 53/006
252/182.1

FOREIGN PATENT DOCUMENTS

CN   1770513 A   5/2006
CN  103000870 A   3/2013

OTHER PUBLICATIONS

Office Action from corresponding Chinese Application No. 201610852821.7 dated Mar. 15, 2018.

* cited by examiner

*Primary Examiner* — Jacob B Marks
(74) *Attorney, Agent, or Firm* — Tucker Ellis LLP

(57) ABSTRACT

The present application relates to the technical field of Li-ion battery and, more particularly, to a positive electrode material for a Li-ion battery, a method for preparing the same, and a Li-ion battery containing the same. The positive electrode material for a Li-ion battery includes a substrate material and a coating layer coated on a surface of the substrate material, wherein the coating layer includes boron, a chemical formula of the substrate material is $Li_xNi_aCo_b Mn_cO_2$, wherein $0.99 < x \leq 1.1$, $0.3 < a < 0.9$, $0.1 < b < 0.4$, $0.1 < c < 0.4$, and $a+b+c=1$; and the substrate material consists of a large particle substrate material and a small particle substrate material. In the present application, by gradation of large particles and small particles, the pellet density, the capacity density, the room-temperature cycle performance, the high-temperature cycle performance and low temperature discharging performance of the Li-ion battery are improved.

10 Claims, 1 Drawing Sheet

(51) Int. Cl.
*H01M 4/131* (2010.01)
*H01M 4/525* (2010.01)
*H01M 4/505* (2010.01)
*H01M 4/48* (2010.01)
*H01M 4/04* (2006.01)
*C01G 53/00* (2006.01)
*H01M 4/62* (2006.01)
*H01M 10/0525* (2010.01)

(52) U.S. Cl.
CPC ......... *H01M 4/0471* (2013.01); *H01M 4/131* (2013.01); *H01M 4/364* (2013.01); *H01M 4/483* (2013.01); *H01M 4/505* (2013.01); *H01M 4/525* (2013.01); *H01M 4/62* (2013.01); *C01P 2004/61* (2013.01); *C01P 2004/84* (2013.01); *C01P 2006/40* (2013.01); *H01M 10/0525* (2013.01)

POSITIVE ELECTRODE MATERIAL FOR LI-ION BATTERY, METHOD FOR PREPARING THE SAME, AND LI-ION POWER BATTERY CONTAINING THE SAME

CROSS-REFERENCE TO RELATED APPLICATIONS

The present application claims the benefit of priority to Chinese Patent Application No. 201610852821.7, filed on Sep. 27, 2016, the content of which is incorporated herein by reference in its entirety.

TECHNICAL FIELD

The present application relates to the technical field of Li-ion battery and, more particularly, to a positive electrode material for a Li-ion battery, a method for preparing the positive electrode material, and a Li-ion power battery containing the positive electrode material.

BACKGROUND

Li-ion batteries have been widely used in more and more fields and, especially, have shown fine application prospect in electric vehicle (Electric Vehicle, EV) and hybrid electric vehicle (Hybrid Electric Vehicle, HEV) fields. The Li-ion battery has become the focus of new energy vehicles. Currently, a positive electrode material for a Li-ion battery is mainly lithium iron phosphate or ternary material (NCM or NCA). The ternary lithium nickel cobalt manganese (NCM) oxide material has attracted attentions from researchers due to its high battery capacity (up to 250 mAh/g, reaching 91% of the theoretical battery capacity), good safety performance, and low price. However, for a power battery, the safety performance, the rate performance, and the cycle performance are its key properties. For the NCM material, a balance among the safety performance, the rate performance, and the cycle performance is a bottleneck limiting its application in the power battery field.

At present, modified methods of NCM material mainly include: phase doping and surface coating. Element of phase doping is Mg, Al, or Ti. Material for coating is usually metal oxide, such as $Al_2O_3$ or $TiO_2$. The safety performance of modified NCM is improved to a certain extent, but the capacity density of NCM is negatively affected, since the material for coating has poor conductivity and thus poor ionic conduction. In addition, the material coated by conductive polymer has poor processability. These problems limit the application of NCM in the power battery.

In order to prevent the above-mentioned problems, the present application is proposed.

SUMMARY

A first purpose of the present application is to provide a positive electrode material for a Li-ion battery.

A second purpose of the present application is to provide a method for preparing the positive electrode material for a Li-ion battery.

A third purpose of the present application is to provide a Li-ion power battery containing the above-mentioned positive electrode material.

In order to achieve the purpose of the present application, technical solutions are as follows:

The positive electrode material for a Li-ion battery, including a substrate material and a coating layer coated on a surface of the substrate material, wherein the coating layer includes boron, a chemical formula of the substrate material is $Li_xNi_aCo_bMn_cO_2$, wherein $0.99<x\leq1.1$, $0.3<a<0.9$, $0.1<b<0.4$, $0.1<c<0.4$, and $a+b+c=1$; the substrate material consists of a large particle substrate material and a small particle substrate material.

Preferably, a particle size of the large particle substrate material is in a range of 10 µm-14 µm, and a particle size of the small particle substrate material is in a range of 3 µm-6 µm.

Preferably, a ratio by weight of the large particle substrate material to the small particle substrate material is 5-9:1-5.

Preferably, a content of Ni in the large particle substrate material is greater than or equal to a content of Ni in the small particle substrate material; preferably, when the content of Ni in the large particle substrate material is greater than the content of Ni in the small particle substrate material, the content of Ni in the large particle substrate material is in a range of 30%-100%.

Preferably, the coating layer consists of $B_2O_3$.

Preferably, the coating layer accounts for 0.01%-0.2% by weight of the positive electrode material, preferably 0.02%-0.1%.

The present application further relates to a Li-ion power battery. The Li-ion power battery includes the above-mentioned positive electrode material.

The present application further relates to a method for preparing the positive electrode material for a Li-ion battery. The method for preparing the positive electrode material for a Li-ion battery includes at least steps as follows:

(1) preparing a precursor of the large particle substrate material according to a molar ratio of each element of the large particle substrate material, and preparing a precursor of the small particle substrate material according to a molar ratio of each element of the small particle substrate material;

(2) mixing the precursor of the large particle substrate material and a lithium source and then sintering a mixture of the precursor of the large particle substrate material and the lithium source to obtain the large particle substrate material; and mixing the precursor of the small particle substrate material and the lithium source and then sintering a mixture of the precursor of the small particle substrate material and the lithium source to obtain the small particle substrate material;

(3) mixing the small particle substrate material obtained in step(2) and the large particle substrate material obtained in step(2) according to a ratio by weight, and then mixing a mixture of the small particle substrate material and the large particle substrate material with a boron source, and sintering a mixture of the small particle substrate material, the large particle substrate material and the boron source to obtain the positive electrode material.

Preferably, in step(2), a sintering temperature is 800° C.-960° C., and a sintering time is 10 h-20 h, after sintering, the mixture is cooled to a room temperature with a cooling rate of 0.5° C./min-2° C./min.

Preferably, in step(3), a sintering temperature is 500° C.-800° C., and a sintering time is 4 h-6 h.

The technical solutions of the present application have at least beneficial effects as follows:

Firstly, the pellet density of the electrode is improved by gradation of large particles and small particles, thereby improving the capacity density of the material.

Secondly, the surface of the substrate material is coated by the coating layer containing boron, so that DCR decreases, thereby improving the power performance. Moreover, the first charging efficiency of the material can be improved, so that the capacity of the battery can be increased, and room-temperature cycle performance, high-temperature cycle performance and low temperature discharging performance of the Li-ion battery can also be improved.

DESCRIPTION OF EMBODIMENTS

Figure 1:
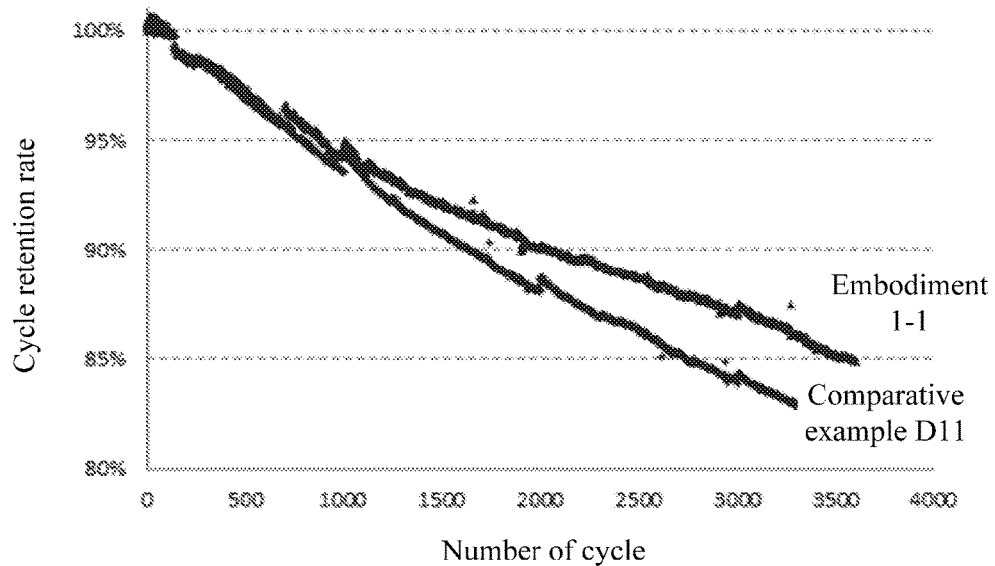
FIG. 1 shows cycling retention rate curves of Embodiment 1-1 and comparative example D11 at room-temperature.

In order to facilitate better understanding of the technical solutions of the present application, a detailed description of the embodiments of the present application will be provided. It should be understood that, these embodiments are merely used to illustrate the present application, rather than limit the present application.

The present application relates to a positive electrode material for a Li-ion battery. The positive electrode material includes a substrate material and a coating layer coated on a surface of the substrate material. The coating layer includes boron. A chemical formula of the substrate material is $Li_xNi_aCo_bMn_cO_2$, wherein $0.99<x\leq1.1$, $0.3<a<0.9$, $0.1<b<0.4$, $0.1<c<0.4$, and $a+b+c=1$. The substrate material consists of a large particle substrate material and a small particle substrate material. By gradation of large particles and small particles and coating modification by compound containing boron, the positive electrode material of the present application is balanced with respect to safety performance, rate performance, and cycle performance, and thus satisfies application requirements of the Li-ion power battery.

In an exemplary embodiment of the positive electrode material for a Li-ion battery of the present application, a particle size of the large particle substrate material is in a range of 10 μm-14 μm, and a particle size of the small particle substrate material is in a range of 3 μm-6 μm. The above-mentioned particle size refers to a median particle size D50. The large particle and small particle in the ranges of the present application are graded, which can improve pellet density of the electrode and thus improve the capacity density of the positive electrode material.

In an exemplary embodiment of the positive electrode material for a Li-ion battery of the present application, a ratio by weight of the large particle substrate material to the small particle substrate material is 5-9:1-5. The large particle and small particle in the ranges of the present application are graded, which can further improve the pellet density of the electrode.

In an exemplary embodiment of the positive electrode material for a Li-ion battery of the present application, a content of Ni in the large particle substrate material is equal to or greater than a content of Ni in the small particle substrate material.

In an exemplary embodiment of the positive electrode material for a Li-ion battery of the present application, a content of Ni in the large particle substrate material is defined as $a_1$, and a content of Ni in the small particle substrate material is defined as $a_2$. When $a_1$ is greater than $a_2$, then $0.3<a_1<1$. In the present application, the content of Ni in the small particle substrate material with a greater surface area decreases, so as to avoid side reaction between the small particle substrate material and electrolyte, thereby decreasing direct current resistance (Direct Current Resistance, DCR) and improving power performance of the Li-ion battery.

In an exemplary embodiment of the positive electrode material for a Li-ion battery of the present application, the coating layer is made of $B_2O_3$. The present application adopts $B_2O_3$ as the coating layer, since $B_2O_3$ has better $Li^+$ diffusivity than other coating materials, the DCR can be reduced, thereby improving power performance of the Li-ion battery.

In an exemplary embodiment of the positive electrode material for a Li-ion battery of the present application, the coating layer accounts for 0.01%-0.2% by weight of the positive electrode material, preferably 0.02%-0.1%, more preferably 0.05%-0.1%. If a content of the coating layer is too great, the processability and the high-temperature storage performance may become poor. If the content of the coating layer is too low, less improvement effect can be achieved.

In the present application, precursors of the large particle substrate material and the small particle substrate material are prepared by a chemical coprecipitation method, and then the precursors are sintered, thereby obtaining the large particle substrate material and the small particle substrate material. The precursor refers to a mixture during the process of the chemical coprecipitation method before obtaining a target product.

The present application further relates to a method for preparing the positive electrode material for a Li-ion battery. The method for preparing the positive electrode material for a Li-ion battery at least includes steps as follows:

(1) preparing a precursor of the large particle substrate material according to a molar ratio of each element of the large particle substrate material, and preparing a precursor of the small particle substrate material according to a molar ratio of each element of the small particle substrate material;

(2) mixing the precursor of the large particle substrate material and a lithium source and then sintering a mixture of the precursor of the large particle substrate material and the lithium source to obtain the large particle substrate material; and mixing the precursor of the small particle substrate material and the lithium source and then sintering a mixture of the precursor of the small particle substrate material and the lithium source to obtain the small particle substrate material;

(3) mixing the small particle substrate material and the large particle substrate material prepared in step(2) in a certain ratio, and then mixing a mixture of the small particle substrate material and the large particle substrate material with a boron source, and sintering a mixture of the small particle substrate material, the large particle substrate material and the boron source to obtain the positive electrode material for a Li-ion battery.

The lithium source is at least one material selected from a group consisting of $Li_2CO_3$, LiOH, and $LiNO_3$. The boron source is selected from a group consisting of $B_2O_3$, boracic acid, and ammonium pentaborate.

In an exemplary embodiment of the method for preparing positive electrode material for a Li-ion battery of the present application, in step(1), soluble salts of Ni, Co, and Mn can be hydrochloride, sulphate, or nitrate, and preferably sulphate; and the coprecipitator is selected from a group consisting of NaOH, KOH, $NH_4HCO_3$ and $NaCO_3$.

In step(1), a method for preparing the precursors includes steps as follows: the soluble salts of Ni, Co, and Mn are weighed according to the molar ratio of each element in the large particle substrate material or in the small particle substrate material, then prepared into water solution, and then the precursors of the large particle substrate material and the small particle substrate material are prepared by the chemical coprecipitation method. A sum of molar concentration of soluble salts is in a range of 4 mol/L-8 mol/L in the water solution.

In an exemplary embodiment of the method for preparing positive electrode material for a Li-ion battery of the present application, in step(2), when sintering, a heating rate is 2° C./min-10° C./min, a sintering temperature is 800° C.-960° C., and a sintering time is 10 h-20 h. After sintering, the mixture is cooled to a room temperature at a cooling rate of 0.5° C./min-2° C./min. Since the mixture is sintered along the heating curve, a residual content of Li of a product in step(2) decreases, and the integrality of material crystal structure is guaranteed. Preferably, the heating rate is in a range of 4° C./min-6° C./min, more preferably 5° C./min. The sintering time is preferably 12 h-18 h, and more preferably 16 h.

Preferably, after sintering, a cooling rate to the room temperature is 0.8° C./min-1.5° C./min, more preferably 1° C./min.

In an exemplary embodiment of the method for preparing positive electrode material for a Li-ion battery of the present application, in step(2), sintering is performed under air atmosphere or oxygen atmosphere.

In an exemplary embodiment of the method for preparing positive electrode material for a Li-ion battery of the present application, in step(3), a heating rate of sintering is 2° C./min-10° C./min, a sintering temperature is 500° C.-800° C., and a sintering time is 4 h-6 h. Since sintering is performed along the heating curve, a residual content of Li of a product in step(3) decreases, and the coating will be more uniform. Preferably, the heating rate is in a range of 3° C./min-4° C./min, and more preferably 3° C./min.

Preferably, the sintering time is 4.5 h-5.5 h, and more preferably 5 h. If the sintering time is too short, the coating uniformity cannot be guaranteed; if the sintering time is too long, the production efficiency is low.

In an exemplary embodiment of the method for preparing positive electrode material for a Li-ion battery of the present application, in step(3), the mixing process is performed by a ball milling method or a dry-method fusion machine. Preferably, a time of mixing is 30 min-3 h, and more preferably 1 h-2 h. The large particles and small particles are sufficiently mixed within the time range.

The present application further relates to a Li-ion power battery containing the positive electrode material of the present application.

With reference to the following embodiments, the present application will be further illustrated. All raw materials used in following embodiments are available in the market.

Embodiments 1-Positive Electrode Material

A positive electrode material for a Li-ion battery includes a substrate material and a coating layer coated on a surface of the substrate material. The coating layer contains $B_2O_3$. A weight ratio of the coating layer to the positive electrode material is 0.1%. A chemical formula of the substrate material is $Li_xNi_aCo_bMn_cO_2$, wherein $0.99<x\leq1.1$, $0.3<a<0.9$, $0.1<b<0.4$, $0.1<c<0.4$, and $a+b+c=1$. The substrate material consists of a large particle substrate material and a small particle substrate material. A chemical formula of the large particle substrate material is $Li_xNi_{a1}Co_{b1}Mn_{c1}O_2$, and a chemical formula of the small particle substrate material is $Li_xNi_{a2}Co_{b2}Mn_{c2}O_2$. Detailed parameters are listed in Table 1.

TABLE 1

| No. | Large particle substrate material | | | Small particle substrate material | | | Ratio by weight of large to small particle substrate material |
|---|---|---|---|---|---|---|---|
| | $a_1:b_1:c_1$ | D50 (μm) | x: (2 − x) | $a_2:b_2:c_2$ | D50 (μm) | x: (2 − x) | |
| 1-1 | 5:2:3 | 11 | 1.05 | 1:1:1 | 4 | 1.05 | 4:1 |
| 1-2 | 5:2:3 | 10 | 1.05 | 1:1:1 | 3 | 1.05 | 4:1 |
| 1-3 | 5:2:3 | 14 | 1.05 | 1:1:1 | 6 | 1.05 | 4:1 |
| 1-4 | 5:2:3 | 12 | 1.05 | 1:1:1 | 5 | 1.05 | 4:1 |
| 1-5 | 5:2:3 | 11 | 1.05 | 1:1:1 | 4 | 1.05 | 1:1 |
| 1-6 | 5:2:3 | 11 | 1.05 | 1:1:1 | 4 | 1.05 | 3:1 |
| 1-7 | 5:2:3 | 11 | 1.05 | 1:1:1 | 4 | 1.05 | 9:1 |
| 1-8 | 6:2:2 | 11 | 1.05 | 1:1:1 | 4 | 1.05 | 4:1 |
| 1-9 | 7:1:2 | 11 | 1.05 | 1:1:1 | 4 | 1.05 | 4:1 |
| 1-10 | 8:1:1 | 11 | 1.05 | 1:1:1 | 4 | 1.05 | 4:1 |
| 1-11 | 5:2:3 | 11 | 1 | 4:3:3 | 4 | 1 | 4:1 |
| 1-12 | 9:0.5:0.5 | 11 | 1.2 | 4:3:3 | 4 | 1.2 | 4:1 |

Preparation of the Positive Electrode Material:

1. Preparation of precursor: nickel sulfate, manganese sulfate, cobaltous sulfate are solved to 5 mol/L solution in molar ratio, and the precursor of the large particle substrate material is prepared by the chemical coprecipitation method using hydroxide. Nickel sulfate, manganese sulfate, cobaltous sulfate are solved to 5 mol/L solution in molar ratio, and the precursor of the small particle substrate material is prepared by the chemical coprecipitation method using hydroxide. The detailed parameters are listed in Table 1. During preparing the precursors, particle sizes are controlled by controlling reaction time, pH value during coprecipitation, and concentration of ammonium.

2. The precursor of the large particle substrate material and a Li source are mixed at a certain ratio, sintered at 900° C. for 14 h, cooled to a room temperature at a cooling rate of 1° C./min, and then broken to obtain the large particle substrate material. The precursor of the small particle substrate material and a Li source are mixed at a certain ratio, heated at a heating rate of 6° C./min, sintered at 900° C. for 14 h, cooled to a room temperature at a cooling rate of 1° C./min, and then broken to obtain the small particle substrate material.

3. The large particle substrate material and the small particle substrate material are mixed at a certain ratio by weight and ball-milled for 1 h. After ball-milling, 0.1% by weight $B_2O_3$ is added and mixed for 2 h, and then the above mixed material is placed in a tray, heated at a heating rate of 6° C./min, and re-sintered at 700° C. for 5 h to obtain the target product.

Preparation of the Battery:

The positive electrode material of the present application is used as an active material. A ratio of the active material is 95%. A coating weight is 0.018 g/cm². A natural graphite is used as a negative electrode. $LiPF_6$ (1 mol/L)/(EC+DEC+DMC) (ratio by volume is 1:1:1) is used as electrolyte. A soft-package battery is assembled with a capacity of 2.2 Ah (1 C capacity) in an environment with ambient humidity<20%.

Embodiment 2

A preparation method of Embodiment 2 is similar to that of Embodiment 1. The ratio of No. 1 raw material of Embodiment 1 is used, and the difference lies in that a content of $B_2O_3$ added in step(3) is different, which is illustrated in Table 2.

TABLE 2

| No. | Content of $B_2O_3$ |
|---|---|
| 2-1 | 0.01% |
| 2-2 | 0.2% |

Embodiment 3

The ratio of No. 1 raw material of Embodiment 1 is used, and the difference lies in that a preparation method of the positive electrode material is as follows:

1. Preparation of precursor: nickel sulfate, manganese sulfate, cobaltous sulfate are solved to 5 mol/L solution, and the precursor of the large particle substrate material is prepared by the chemical coprecipitation method using hydroxide. Nickel sulfate, manganese sulfate, cobaltous sulfate are solved to 5 mol/L solution, and the precursor of the small particle substrate material is prepared by the chemical coprecipitation method using hydroxide.

2. The precursor of the large particle substrate material and a Li source are mixed at a certain ratio and sintered, and then broken to obtain the large particle substrate material. The precursor of the small particle substrate material and a Li source are mixed at a certain ratio and sintered, and then broken to obtain the small particle substrate material. Sintering parameters are listed in Table 3.

3. The large particle substrate material and the small particle substrate material are mixed at a certain ratio by weight and ball-milled for 1 h. After ball-milling, 0.1% by weight $B_2O_3$ is added and mixed for 2 h, and then the above mixed material is placed in a tray and re-sintered to obtain the target product. Sintering parameters are listed in Table 3.

TABLE 3

| | Step (2) | | | | Step (3) | | |
|---|---|---|---|---|---|---|---|
| No. | Heating rate | Sintering temperature | Sintering time | Cooling rate | Heating rate | Sintering temperature | Sintering time |
| 3-1 | 2° C./min | 800° C. | 20 h | 0.8° C./min | 8° C./min | 500° C. | 6 h |
| 3-2 | 4° C./min | 960° C. | 10 h | 1.2° C./min | 10° C./min | 800° C. | 4 h |
| 3-3 | 8° C./min | 850° C. | 18 h | 0.9° C./min | 2° C./min | 600° C. | 5.5 h |
| 3-4 | 10° C./min | 920° C. | 14 h | 1.5° C./min | 4° C./min | 750° C. | 5 h |

COMPARATIVE EXAMPLE 1

A preparation method of Comparative example 1 is similar to that of Embodiment 1, the difference lies in that a substrate material of only one particle size is adopted, the structural formula of the substrate material is $Li_x(Ni_aCo_bMn_c)_{2-x}O_2$, detailed parameters are shown in Table 4.

TABLE 4

| No. | a:b:c | D50 (µm) | x: (2 − x) |
|---|---|---|---|
| D1 | 1:1:1 | 11 | 1.05 |
| D2 | 1:1:1 | 4 | 1.05 |
| D3 | 1:1:1 | 8 | 1.05 |

COMPARATIVE EXAMPLE 2

A preparation method of Comparative example 2 is similar to that of Embodiment 1, the difference lies in that: parameters such as the particle size and ratio of the substrate material are changed, the substrate material consists of a large particle substrate material and a small particle substrate material, the structural formula of the large particle substrate material is $Li_x(Ni_{a1}Co_{b1}Mn_{c1})_{2-x}O_2$, the structural formula of the small particle substrate material is $Li_x(Ni_{a2}Co_{b2}M_{c2})_{2-x}O_2$, detailed parameters are shown in Table 5.

TABLE 5

| | Large particle substrate material | | | Small particle substrate material | | | Ratio by weight of large to small particle substrate material |
|---|---|---|---|---|---|---|---|
| No. | $a_1:b_1:c_1$ | D50 (µm) | x: (2 − x) | $a_2:b_2:c_2$ | D50 (µm) | x: (2 − x) | |
| D4 | 5:2:3 | 16 | 1.05 | 1:1:1 | 2 | 1.05 | 4:1 |
| D5 | 5:2:3 | 20 | 1.05 | 1:1:1 | 2 | 1.05 | 4:1 |
| D6 | 5:2:3 | 12 | 1.05 | 1:1:1 | 8 | 1.05 | 4:1 |
| D7 | 5:2:3 | 12 | 1.05 | 1:1:1 | 10 | 1.05 | 4:1 |
| D8 | 5:2:3 | 11 | 1.05 | 1:1:1 | 4 | 1.05 | 1:2 |
| D9 | 5:2:3 | 11 | 1.05 | 1:1:1 | 4 | 1.05 | 1:4 |
| D10 | 5:2:3 | 8 | 1.05 | 1:1:1 | 4 | 1.05 | 4:1 |

COMPARATIVE EXAMPLE 3

A preparation method of Comparative example 3 is similar to that of Embodiment 1, the ratio of No. 1 raw material of Embodiment 1 is used, and the difference lies in that a content of $B_2O_3$ added in step(3) is different, which is illustrated in Table 6.

TABLE 6

| No. | Content of $B_2O_3$ |
|---|---|
| D11 | 0 |
| D12 | 0.3% |

EXPERIMENTAL EXAMPLE

Test Method:
1. Method for Testing Battery Capacity

Under a voltage of 2.8V-4.2V, the battery is charged with 1 C (1 C=2.2 A) to 4.2V, and then charged at a constant voltage of 4.2 V to a current ≤110 mA, stand by for 5 min, then the battery is discharged to 2.8V with 1 C (2.2 A). The battery is charged and discharged for two cycles according to the above mentioned method. The discharge capacity of the second cycle is used as 1 C capacity. The 1 C capacity is divided by a weight of the positive electrode material to obtain a 1 C capacity per gram of the positive electrode material. Results are listed in Table 7.

2. Method for Testing a First Discharging Efficiency of the Battery

Under a voltage of 2.8V-4.2V, the battery is charged with 0.5 C (1 C=2.2 A) to 4.2V, and then charged at a constant voltage of 4.2 V to a current ≤110 mA, stand by for 5 min (at this moment the charging capacity is recorded as C0), then the battery is discharged to 2.8V with 0.5 C (1 C=2.2 A) (at this moment the discharging capacity is recorded as D0). The first discharging efficiency of the battery is D0/C0*100%. Results are listed in Table 7.

3. Method for Testing Direct Current Resistant

Step1, testing of capacity (at 25° C.)
  a. stand by for 5 min;
  b. discharged to 2.8V with a constant current of 1 C;
  c. stand by for 5 min;
  d. charged to 4.2V with a constant current of 1 C, and charged to a current ≤0.05 C at a constant voltage of 4.2V;
  e. stand by for 5 min; and
  f. discharged to 2.8V with a constant current of 1 C (1 C=2.2 A), and stand by for 5 min. A real discharging capacity in step f is recorded as C0.

Step2, testing of direct current resistance under different states of charge (State of Charge, SOC)

Under 90% SOC-Test of DCR
  a. stand by for 5 min;
  b. charged to 4.2V with 1 C, and then charged to a current ≤0.05 C at a constant voltage of 4.2V;
  c. stand by for 5 min;
  d. discharged for 6 min with a constant current of 1 C0 until 90% SOC is reached;
  e. stand by for 60 min; and
  f. discharged for 30 s with 4 C0, voltages before and after discharging are recorded.

Under 50% SOC-Test of DCR
  a. stand by for 5 min;
  b. charged to 4.2V with 1 C, and then charged to a current ≤0.05 C at a constant voltage of 4.2V;
  c. stand by for 5 min;
  d. discharged for 30 min with a constant current of 1 C0 until 50% SOC is reached;
  e. stand by for 60 min; and
  f. discharged for 30 s with 4 C0, voltages before and after discharging are recorded.

Under 20% SOC-Test of DCR
  a. stand by for 5 min;
  b. charged to 4.2V with 1 C, and then charged to a current ≤0.05 C at a constant voltage of 4.2V;
  c. stand by for 5 min;
  d. discharged for 48 min with a constant current of 1 C0 until 20% SOC is reached;
  e. stand by for 60 min; and
  f. discharged for 30 s with 4 C0, voltages before and after discharging are recorded.

A calculation formula of the direct current resistance under different SOC is illustrated as follows. The lower the direct current resistance, the better the performance of the battery.

Direct current resistance=(voltage before discharging−voltage after discharging)/4 C0

Results are listed in Table 8.

4. Cycle Performance at Room Temperature
  a. stand by for 5 min;
  b. discharged to 2.8V with a constant current of 1 C;
  c. stand by for 5 min;
  d. charged to 4.2V with a constant current of 1 C, and then charged to a current ≤0.05 C at a constant voltage of 4.2V;
  e. stand by for 5 min;
  f. discharged to 2.8V with a constant current of 1 C, the capacity is Cn (n=0,1,2,3 . . . ); and
  g. stand by for 5 min.

At 25° C., repeating steps d to g, until Cn/C0 is smaller than 80%. The greater n is, the better the cycle performance is. Result is shown in FIG. 1.

5. Cycle Performance at High Temperature
  a. stand by for 5 min;
  b. discharged to 2.8V with a constant current of 1C;
  c. stand by for 5 min;
  d. charged to 4.2V with a constant current of 1 C, and then charged to a current ≤0.05 C at a constant voltage of 4.2V;
  e. stand by for 5 min;
  f. discharged to 2.8V with a constant current of 1 C, the capacity is Cn (n=0,1,2,3 . . . ); and
  g. stand by for 5 min.

Figure 2:
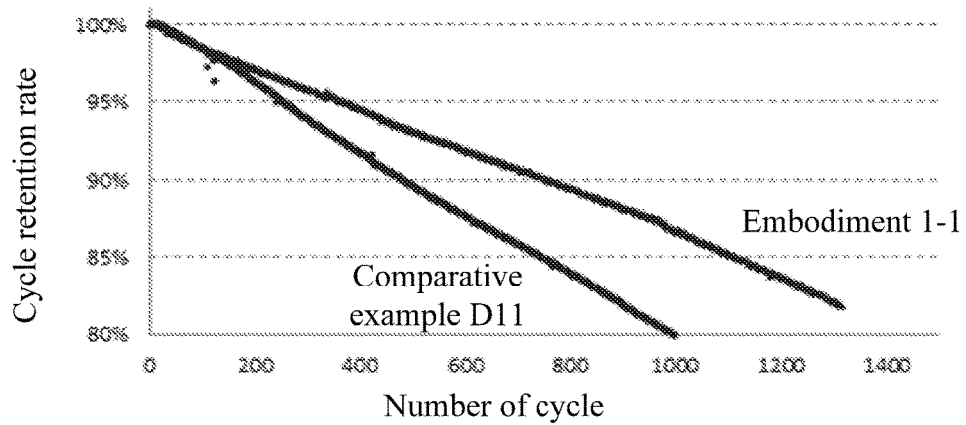
FIG. 2 shows cycling retention rate curves of Embodiment 1-1 and comparative example D11 at high-temperature.

At 60° C., repeating steps d to g, until Cn/C0 is smaller than 80%. The greater n is, the better the cycle performance is. Result is shown in FIG. 2.

6. Discharging Performance at Low Temperature

Method for Testing Capacity at 25° C.
  a. stand by for 5 min;
  b. discharged to 2.8V with a constant current of 1 C;
  c. stand by for 5 min;
  d. charged to 4.2V with a constant current of 1 C, and then charged to a current ≤0.05 C at a constant voltage of 4.2V;
  e. stand by for 5 min; and
  f. discharged to 2.8V with a constant current of 1 C (1 C=2.2 A), and stand by for 5 min. A real discharging capacity in step f is recorded as C0.

Method of Testing Capacity at −20° C.
  a. the battery is placed in a thermostat of −20° C. and kept for 120 min;
  b. discharged to 2.8V with a constant current of 1 C;
  c. stand by for 5 min;
  d. charged to 4.2V with a constant current of 1 C, and then charged to a current ≤0.05 C at a constant voltage of 4.2V;
  e. stand by for 5 min; and
  f. discharged to 2.8V with a constant current of 1 C (1 C=2.2 A), and stand by for 5 min. A real discharging capacity in step f is recorded as C1.

A ratio of C1 to C0 is calculated. The greater the ratio, the better the discharging performance at low temperature. Results are listed in Table 9.

7. Pellet Density

In a process of preparing the soft-package battery, the electrodes are cold-pressed for one time with a same composition of the electrode a same coating weight, and same parameters of cold-pressing. A thickness of the electrode after cold-pressing is tested, and a pellet density of the positive electrode material is calculated. Results are listed in Table 10.

The Li-ion batteries of the embodiments of the present application and the comparative examples are tested by the above-mentioned testing method, and experimental results are listed in Tables 7-10 and shown in FIGS. 1-2.

TABLE 7

| No. | 25° C. 1 C Capacity (mAh/g) | Efficiently (%) |
| --- | --- | --- |
| 1-1 | 155 | 88.0 |
| 1-2 | 156 | 87.6 |

TABLE 7-continued

| No. | 25° C. 1 C Capacity (mAh/g) | Efficiently (%) |
|---|---|---|
| 1-3 | 153 | 87.5 |
| 1-4 | 153 | 86.8 |
| 1-5 | 152 | 87.0 |
| 1-6 | 155 | 87.5 |
| 1-7 | 156 | 86.9 |
| 1-8 | 160 | 88.5 |
| 1-9 | 167 | 87.8 |
| 1-10 | 176 | 88.2 |
| 1-11 | 154 | 87.4 |
| 1-12 | 182 | 87.9 |
| 2-1 | 153 | 87.4 |
| 2-2 | 155 | 88.6 |
| D1 | 144 | 87.5 |
| D2 | 148 | 86.8 |
| D3 | 146 | 87.4 |
| D4 | 152 | 87.7 |
| D5 | 149 | 87.6 |
| D6 | 155 | 88.2 |
| D7 | 155 | 87.5 |
| D8 | 150 | 87.3 |
| D9 | 148 | 87.0 |
| D10 | 159 | 86.5 |
| D11 | 150 | 85.2 |
| D12 | 148 | 86.0 |

TABLE 8

| | 25° C. DCR (mΩ) | | |
|---|---|---|---|
| No. | 90% SOC | 50% SOC | 20% SOC |
| 1-1 | 29.5 | 26.4 | 31.8 |
| 1-2 | 29.1 | 25.9 | 30.7 |
| 1-3 | 32.2 | 29.4 | 34.3 |
| 1-4 | 30.5 | 27.2 | 32.0 |
| 1-5 | 30.1 | 27.5 | 33.9 |
| 1-6 | 29.6 | 26.6 | 32.1 |
| 1-7 | 29.3 | 26.1 | 31.0 |
| 1-8 | 30.4 | 27.7 | 32.8 |
| 1-9 | 29.5 | 26.7 | 31.7 |
| 1-10 | 29.2 | 27.3 | 32.1 |
| 1-11 | 30.4 | 26.8 | 31.4 |
| 1-12 | 26.8 | 24.8 | 28.2 |
| 2-1 | 33.9 | 30.4 | 36.5 |
| 2-2 | 30.7 | 26.5 | 32.6 |
| D1 | 33.8 | 33.6 | 41.7 |
| D2 | 31.2 | 29.2 | 37.5 |
| D3 | 31.5 | 29.2 | 35.1 |
| D4 | 32.8 | 29.9 | 35.9 |
| D5 | 33.5 | 33.1 | 41.3 |
| D6 | 30.7 | 27.4 | 32.2 |
| D7 | 31.2 | 28.1 | 33.4 |
| D8 | 30.5 | 28.0 | 35.1 |
| D9 | 30.7 | 28.5 | 36.1 |
| D10 | 29.5 | 27.9 | 31.2 |
| D11 | 34.8 | 31.2 | 37.5 |
| D12 | 35.4 | 31.7 | 38.1 |

TABLE 9

| No. | Low-temperature discharging performance (%) |
|---|---|
| 1-1 | 69% |
| 1-2 | 70% |
| 1-3 | 70% |
| 1-4 | 65% |
| 1-5 | 71% |
| 1-6 | 73% |
| 1-7 | 75% |
| 1-8 | 72% |
| 1-9 | 74% |
| 1-10 | 76% |
| 1-11 | 72% |
| 1-12 | 78% |
| 2-1 | 62% |
| 2-2 | 65% |
| D1 | 60% |
| D2 | 70% |
| D3 | 63% |
| D4 | 64% |
| D5 | 68% |
| D6 | 63% |
| D7 | 63% |
| D8 | 68% |
| D9 | 65% |
| D10 | 70% |
| D11 | 61% |
| D12 | 56% |

TABLE 10

| No. | Pellet density |
|---|---|
| 1-1 | 3.6 |
| 1-2 | 3.5 |
| 1-3 | 3.4 |
| 1-4 | 3.5 |
| 1-5 | 3.3 |
| 1-6 | 3.5 |
| 1-7 | 3.45 |
| 1-8 | 3.55 |
| 1-9 | 3.5 |
| 1-10 | 3.45 |
| 1-11 | 3.6 |
| 1-12 | 3.4 |
| 2-1 | 3.6 |
| 2-2 | 3.6 |
| D1 | 3.4 |
| D2 | 2.8 |
| D3 | 3.2 |
| D4 | 3.7 |
| D5 | 3.8 |
| D6 | 3.5 |
| D7 | 3.4 |
| D8 | 3.2 |
| D9 | 3.0 |
| D10 | 3.0 |
| D11 | 3.6 |
| D12 | 3.6 |

As shown in FIG. 1, according to cycling retention rate curves of Embodiment 1-1 and comparative example D11 at room-temperature, it is shown that by adopting the coating layer, the cycling retention rate of the Li-ion battery at room-temperature is improved significantly. As shown in FIG. 2, according to cycling retention rate curves of Embodiment 1-1 and comparative example D11 at high-temperature, it is shown that by adopting the coating layer, the cycling retention rate of the Li-ion battery at high-temperature is also improved significantly.

Through comparison of Embodiments and comparative examples, the pellet density of the electrode can be further improved by gradation of large particles and small particles. In addition, when a content of Ni in the large particle substrate material is greater than a content of Ni in the small particle substrate material, DCR can be further decreased, thereby improving the power performance of the Li-ion battery.

Through comparison of Embodiments and comparative examples, when $B_2O_3$ is used as the coating layer, DCR decreases, thereby improving the power performance of the Li-ion battery. Additionally, when a content of the coating layer is in a range of the present application, the power performance is the best.

The embodiments described above are merely preferred embodiments of the present application and they do not limit the present application. Any modification, equivalent replacement, and improvement made within the spirit and principle of the present application shall fall within the scope of the present application.

What is claimed is:

1. A positive electrode material for a Li-ion battery, comprising a substrate material and a coating layer coated on a surface of the substrate material, wherein the coating layer comprises boron, a chemical formula of the substrate material is $Li_xNi_aCo_bMn_cO_2$, wherein $0.99<x\leq1.1$, $0.3<a<0.9$, $0.1<b<0.4$, $0.1<c<0.4$, and $a+b+c=1$; the substrate material consists of a large particle substrate material and a small particle substrate material.

2. The positive electrode material for a Li-ion battery according to claim 1, wherein a particle size of the large particle substrate material is in a range of 10 μm-14 μm, and a particle size of the small particle substrate material is in a range of 3 μm-6 μm.

3. The positive electrode material for a Li-ion battery according to claim 1, wherein a weight ratio of the large particle substrate material with respect to the small particle substrate material is 5-9:1-5.

4. The positive electrode material for a Li-ion battery according to claim 1, wherein a content of Ni in the large particle substrate material is greater than or equal to a content of Ni in the small particle substrate material; preferably, when the content of Ni in the large particle substrate material is greater than the content of Ni in the small particle substrate material, the content of Ni in the large particle substrate material is in a range of 30%-100%.

5. The positive electrode material for a Li-ion battery according to claim 1, wherein the coating layer consists of $B_2O_3$.

6. The positive electrode material for a Li-ion battery according to claim 1, wherein the coating layer accounts for 0.01%-0.2% by weight of the positive electrode material, preferably 0.02%-0.1%.

7. A Li-ion power battery, comprising the positive electrode material according to claim 1.

8. A method for preparing the positive electrode material for a Li-ion battery according to claim 1, comprising at least steps as follows:
(1) preparing a precursor of the large particle substrate material according to a molar ratio of all the elements in the large particle substrate material, and preparing a precursor of the small particle substrate material according to a molar ratio of all the elements in the small particle substrate material;
(2) mixing the precursor of the large particle substrate material and a lithium source and then sintering a thus obtained mixture of the precursor of the large particle substrate material and the lithium source to obtain the large particle substrate material;
and mixing the precursor of the small particle substrate material and a lithium source and then sintering a thus obtained mixture of the precursor of the small particle substrate material and the lithium source to obtain the small particle substrate material;
(3) mixing the small particle substrate material obtained in step(2) and the large particle substrate material obtained in step (2) according to a weight ratio, and then mixing a thus obtained mixture of the small particle substrate material and the large particle substrate material with a boron source, and sintering a thus obtained mixture of the small particle substrate material, the large particle substrate material and the boron source to obtain the positive electrode material.

9. The method for preparing the positive electrode material for a Li-ion battery according to claim 8, wherein in step (2), a sintering temperature is 800° C.-960° C., and a sintering time is 10 h-20 h, after sintering, the mixture is cooled to a room temperature with a cooling rate of 0.5° C./min-2° C./min.

10. The method for preparing the positive electrode material for a Li-ion battery according to claim 8, wherein in step (3), a sintering temperature is 500° C.-800° C., and a sintering time is 4 h-6 h.

* * * * *